(12) United States Patent
Michetti et al.

(10) Patent No.: US 11,179,916 B2
(45) Date of Patent: *Nov. 23, 2021

(54) LAMINATED GLAZING (71) Applicant: Pilkington Group Limited, Lancashire (GB)

(72) Inventors: Massimo Michetti, San Salvo (IT); Joachim Pilz, Oer-Erkenschwick (DE)

(73) Assignee: PILKINGTON GROUP LIMITED, Lancashire (GB)

( * ) Notice: Subject to any disclaimer, the term of this patent is extended or adjusted under 35 U.S.C. 154(b) by 64 days.

This patent is subject to a terminal disclaimer.

(21) Appl. No.: 16/693,570

(22) Filed: Nov. 25, 2019

(65) Prior Publication Data

US 2020/0094528 A1     Mar. 26, 2020

Related U.S. Application Data (63) Continuation of application No. 15/923,404, filed on Mar. 16, 2018, now Pat. No. 10,486,396, which is a
(Continued)

(30) Foreign Application Priority Data

Dec. 16, 2013    (GB) ..................................... 1322240

(51) Int. Cl.
     *B32B 3/00*         (2006.01)
     *B32B 17/10*       (2006.01)
     (Continued)

(52) U.S. Cl.
     CPC .... *B32B 17/10137* (2013.01); *B32B 17/1011* (2013.01); *B32B 17/10036* (2013.01);
(Continued)

(58) Field of Classification Search
CPC ........ B32B 17/10036; B32B 17/10137; B32B 17/10119; B32B 17/10005; B32B 17/10889; B32B 17/10935
See application file for complete search history.

(56) References Cited

U.S. PATENT DOCUMENTS

| | | |
|---|---|---|
| 3,333,934 A | 8/1967 | Seymour |
| 3,592,726 A | 7/1971 | Blizard |
| | (Continued) | |

FOREIGN PATENT DOCUMENTS

| | | |
|---|---|---|
| EP | 0677486 A2 | 10/1995 |
| EP | 0887180 A2 | 12/1998 |
| | (Continued) | |

OTHER PUBLICATIONS

Office Action dated Sep. 4, 2018 issued by JPO in corresponding JP Application No. 2016-540480 with Englisll language summary.
(Continued)

*Primary Examiner* — Elizabeth E Mulvaney
(74) *Attorney, Agent, or Firm* — Buchanan Ingersoll & Rooney PC (57) ABSTRACT

A laminated glazing comprising a first ply of glazing material and a second ply of glazing material joined by at least one ply of adhesive interlayer material is disclosed. The first ply of glazing material comprises a sheet of glass having a first composition and the second ply of glazing material comprises a sheet of glass having a second composition different to the first composition. The laminated glazing has (i) a peripheral region extending around the periphery of the laminated glazing, the laminated glazing having a surface compression stress in the peripheral region and (ii) an edge compression, wherein the magnitude of edge compression is greater than the magnitude of the surface compression stress in the peripheral region. A method of making such a lami-
(Continued)

nated is provided. A glass sheet suitable for being incorporated in such a laminated glazing is also disclosed.

20 Claims, 5 Drawing Sheets

Related U.S. Application Data continuation of application No. 15/105,470, filed as application No. PCT/GB2014/053720 on Dec. 16, 2014, now Pat. No. 9,919,496.

(51) Int. Cl.
*C03B 23/025* (2006.01)
*C03C 3/087* (2006.01)
*C03C 8/00* (2006.01)
*B60J 1/02* (2006.01)
*B60J 1/08* (2006.01)
*B60J 1/18* (2006.01)

(52) U.S. Cl.
CPC .. *B32B 17/10091* (2013.01); *B32B 17/10119* (2013.01); *B32B 17/10761* (2013.01); *B32B 17/10807* (2013.01); *B32B 17/10889* (2013.01); *B32B 17/10935* (2013.01); *C03B 23/0252* (2013.01); *C03C 3/087* (2013.01); *C03C 8/00* (2013.01); *B32B 2605/006* (2013.01); *B60J 1/02* (2013.01); *B60J 1/08* (2013.01); *B60J 1/18* (2013.01); *C03C 2205/00* (2013.01)

(56) References Cited

U.S. PATENT DOCUMENTS

| | | |
|---|---|---|
| 4,236,909 A | 12/1980 | Thomas et al. |
| 4,400,194 A | 8/1983 | Starr |
| 5,385,786 A | 1/1995 | Shetterly et al. |
| 5,536,581 A | 7/1996 | Shetterly et al. |
| 5,597,397 A | 1/1997 | Funk et al. |
| 5,972,513 A | 10/1999 | Yoshizawa |
| 6,015,619 A | 1/2000 | Schnabel et al. |
| 6,518,211 B1 | 2/2003 | Bradshaw et al. |
| 7,666,511 B2 | 2/2010 | Ellison et al. |
| 2002/0106519 A1 | 8/2002 | Takahara |
| 2004/0098946 A1 | 5/2004 | Meerman |
| 2012/0094084 A1 | 4/2012 | Fisher et al. |
| 2012/0328843 A1 | 12/2012 | Cleary et al. |
| 2013/0295357 A1 | 11/2013 | Cleary et al. |
| 2015/0132538 A1 | 5/2015 | Cleary et al. |
| 2016/0308425 A1 | 10/2016 | Bauer et al. |

FOREIGN PATENT DOCUMENTS

| | | |
|---|---|---|
| EP | 1215039 A2 | 6/2002 |
| GB | 1359167 A | 7/1974 |
| GB | 2078169 A | 1/1982 |
| JP | H08506564 A | 7/1996 |
| JP | 2016540480 A | 12/2016 |
| WO | 9417997 A1 | 8/1994 |
| WO | 9948824 A1 | 9/1999 |
| WO | 2005033026 A1 | 4/2005 |
| WO | 2013181505 A1 | 12/2013 |
| WO | 2014148020 A1 | 9/2014 |

OTHER PUBLICATIONS

Office Action dated Apr. 2, 2019 issued by JPO in corresponding JP Application No. 2016-540480 with English language summary.
Office Action (First) dated Jun. 27, 2017, by the State Intellectual Property Office of the Peoples Republic of China in corresponding Chinese Patent Application No. 201480068438.1 and an English translation of the Office Action. (21 pgs).
International Search Report (PCT/ISA/210) dated Feb. 26, 2015, by the European Patent Office as the International Searching Authority for International Application No. PCT/GB2014/053720.
Written Opinion (PCT/ISA/237) dated Feb. 26, 2015, by the European Patent Office as the International Searching Authority for International Application No. PCT/GB2014/053720.

LAMINATED GLAZING

This application is a continuation of U.S. application Ser. No. 15,923,404 filed on Mar. 16, 2018, which is a continuation of U.S. application Ser. No. 15/105,470 filed on Jun. 16, 2016, now U.S. Pat. No. 9,919,496, which is the U.S. National Stage of International Application No. PCT/GB2014/053720 filed on Dec. 16, 2014, which claims the benefit of UK Application No. 1322240.1 filed on Dec. 16, 2013, the entire content of each of which is incorporated herein by reference.

The present invention relates to a laminated glazing, in particular to a light weight laminated glazing for use in a vehicle.

Conventional laminated glazings for automotive windscreens comprise two plies of soda-lime-silicate glass joined by a ply of polyvinyl butyral (PVB). Typically each glass ply is 2.1 mm thick and the PVB ply is typically 0.76 mm thick.

In order to reduce the weight of the windscreen, it is possible to reduce the thickness of one or both of the glass plies. However in reducing the thickness of the soda-lime-silicate glass plies, it is not possible to satisfy the strict requirements of ECE R43 needed to be fulfilled by a vehicle windscreen. As the glass plies become thinner it becomes less able to maintain integrity in the event of an impact. To be classed as a windscreen, the windscreen must be able to maintain integrity in the event of an impact, for example by the head of the driver or passenger.

It is desirable to have a thinner windscreen that is at least as strong as a conventional windscreen and has at least comparable, even the same or better, stone impact performance.

One option is to use thermally toughened glass but it is difficult to thermally toughen thin glass sheets.

GB1359167A describes an article having an edge portion of glass or glass-ceramic containing compressive surface stresses due to chemical tempering that has a protective covering or coverings adhered thereto and comprising fibre reinforced plastics material or one or more plastics coated or plastics impregnated filaments or rovings.

U.S. Pat. No. 3,592,726 describes a multi-layer glass article suitable for use as a vehicle closure, such as an automobile windshield. Such a vehicle closure comprises an inner sheet of chemically strengthened glass bonded by a transparent plastic interlayer to an outer sheet of glass which, if strengthened at all, is strengthened to a lesser degree than the inner sheet.

It is known from US2013/0295357A1 to use a chemically toughened outer glass ply and a non-chemically toughened inner glass ply joined by a polymer interlayer to produce a laminated glazing. US2013/0295357A1 also describes a glass laminate structure having a non-chemically strengthened external glass sheet, a chemically strengthened internal glass sheet, and at least one polymer interlayer intermediate the external and internal glass sheets.

It is known from WO2013/181505A1 to use an inner ply of chemically strengthened glass and an outer ply of soda lime-silicate glass. Flaws are formed in the ply of chemically strengthened glass to provide the laminate with a specific impact breakage performance.

US2012/0328843A1 describes laminates where the external ply is chemically strengthened and the inner ply is not chemically strengthened. US2012/0094084A1 describes glass laminates, more particularly chemically-strengthened glass laminates having low weight, high impact resistance and sound-damping properties.

A consideration for a laminated glazing used as a vehicle windscreen, i.e. a windscreen in an automobile, is the stress characteristics of the inner and/or outer plies of glazing material prior to being laminated as these properties help determine the corresponding properties in the resultant laminated glazing.

In view of the foregoing, thin lightweight glazings that meet the requirements of ECE R43 are desirable. By using an outer pane of glazing material having certain stress characteristics it is possible to provide an improved thin lightweight glazing.

Accordingly the present invention provides from a first aspect a laminated glazing comprising a first ply of glazing material and a second ply of glazing material joined by at least one ply of adhesive interlayer material, the first ply of glazing material comprising a sheet of glass having a first composition and the second ply of glazing material comprising a sheet of glass having a second composition different to the first composition, wherein the laminated glazing has (i) a peripheral region extending around the periphery of the laminated glazing, the laminated glazing having a surface compression stress in the peripheral region and (ii) an edge compression, wherein the magnitude of the edge compression is greater than the magnitude of the surface compression stress in the peripheral region.

Such a laminated glazing according to the present is lightweight and has improved stone impact performance compared to conventional laminated windscreens.

Preferably the peripheral region extends in a band around the entire periphery of the laminated glazing.

Preferably the band extends a distance from the periphery of the laminated glazing wherein the distance is between 200 mm and 400 mm, more preferably between 280 mm and 320 mm, even more preferably about 300 mm. The distance may be between 100 mm and 200 mm.

Preferably the peripheral region or the band extends a uniform spacing from the periphery of the glazing. Preferably spacing is between 200 mm and 400 mm, more preferably between 280 mm and 320 mm, even more preferably about 300 mm. The spacing may be between 100 mm and 200 mm.

Preferably the surface compression stress in the peripheral region is between 5 MPa and 25 MPa, more preferably between 7 MPa and 25 MPa, even more preferably between 10 MPa and 20 MPa.

Preferably the first ply of the laminated glazing has an edge region having a residual edge stress with a net tension wherein the residual edge stress of the first ply in the edge region has a net tension less than 15 MPa, more preferably less than 14 MPa, even more preferably less than 13 MPa, even more preferably less than 12 MPa, most preferably less than 11 MPa.

In the laminated glazing the first ply of glazing material has an edge compression.

Preferably the edge compression of the first ply is greater than 24 MPa, more preferably greater than 25 MPa, even more preferably greater than 26 MPa, even more preferably greater than 27 MPa, even more preferably greater than 28 MPa, even more preferably greater than 29 MPa, even more preferably greater than 30 MPa.

Suitably, inboard of the peripheral region the laminated glazing has a central region where the target is to have the surface of the laminated glazing in the central region in compression.

Suitably, inboard of the peripheral region the laminated glazing has a central region where the surface of the laminated glazing in the central region is in compression.

Suitably inboard of the peripheral region the first ply of glazing material has a central region where the surface of the first ply of glazing material in the central region thereof is in compression.

Suitably inboard of the peripheral region the first ply of glazing material has a central region wherein the target is to have the surface of the first ply of glazing material in the central region thereof in compression.

Preferably the first ply of glazing material has a thickness between 1.5 mm and 2.5 mm, more preferably between 1.6 mm and 2.3 mm.

Preferably the second ply of glazing material has a thickness between 0.2 mm and 1.5 mm, more preferably between 0.4 mm and 1.2 mm, even more preferably between 0.5 mm and 1 mm.

Preferably the first composition is a soda-lime-silicate glass composition. Soda-lime-silicate glass is often referred to as soda-lime-silica glass, or simply "soda-lime" glass.

Preferably the first ply of glazing material is a sheet of soda-lime-silicate glass, in particular a sheet of float glass.

Preferably the second composition is an alkali aluminosilicate glass composition.

Preferably the second composition includes at least about 6 wt % (percent by weight) aluminium oxide ($Al_2O_3$).

Suitably the second ply of glazing material is chemically strengthened.

Suitably the first ply of glazing material prior to being laminated has a residual surface compression stress in the peripheral zone different to the residual surface compression stress of the first ply of glazing material when incorporated in the laminated glazing.

Preferably the first ply of glazing material prior to being laminated has a surface compression stress in the peripheral region between 5 MPa and 30 MPa, preferably between 7 MPa and 30 MPa, more preferably between 10 MPa and 25 MPa, even more preferably between 15 MPa and 25 MPa, most preferably between 15 MPa and 20 MPa.

Suitably the first ply of glazing material prior to being laminated has a central region inboard of peripheral region wherein the surface of the first ply of glazing material in the central region is in compression.

Suitably the first ply of glazing material prior to being laminated has a central region inboard of the peripheral region wherein the target is to have the surface of the first ply of glazing material in the central region in compression.

When the first and/or second ply of glazing material is incorporated in the laminated glazing, stresses are imparted onto the first and/or second ply of glazing material to modify the surface compression stresses thereof. Generally the surface compression stress of the first ply of glazing material is lower in the laminated glazing than prior to being incorporated in the laminated glazing. Preferably the net tension of the first ply of glazing material in the edge region prior to being laminated is the same as the net tension of the first ply of glazing material in the edge region when incorporated in the laminated glazing.

Preferably the edge compression of the first ply of glazing material prior to being laminated is the same as the edge compression of the first ply of glazing material when incorporated in the laminated glazing.

Absent any other external stresses, for example when a ply of glazing material or a laminated glazing is incorporated in a frame or vehicle body, the stresses in the ply of glazing material or laminated glazing are known as residual stresses.

Suitably the first ply of glazing material has a concave surface and an opposing convex surface, wherein the concave surface faces the ply of adhesive interlayer material.

Preferably the first ply of glazing material is bent using a press bending process.

Suitably the second ply of glazing material has a concave surface and an opposing convex surface, wherein the convex surface faces the ply of adhesive interlayer material.

Preferably the second ply of glazing material is bent using a gravity sag bending process.

Preferably the laminated glazing is curved in at least one direction. Preferably the radius of curvature in the at least one direction is between 500 mm and 20000 mm, more preferably between 1000 mm and 8000 mm.

Preferably the adhesive interlayer material comprises polyvinyl butyral (PVB), EVA, PVC, EMA, polyurethane, acoustic modified PVB or Uvekol (a liquid curable resin).

Preferably the adhesive interlayer material has a thickness between 0.3 mm and 2.3 mm, more preferably between 0.3 mm and 1.6 mm, most preferably between 0.3 and 0.8 mm.

Suitably the laminated glazing is flat, or substantially flat.

Suitably the peripheral region extends in a band around the entire periphery of the laminated glazing defined in relation to the first and/or second ply of glazing material.

Preferably the first and/or second ply of glazing material is a single sheet of glass.

In some embodiments the first and/or second composition is a composition as described in WO2014/148020A1.

Preferably the first and/or second ply of glazing material comprises a sheet of glass having a composition comprising 66-72 mol. % $SiO_2$, 1-4 mol. % $Al_2O_3$, 8-15 mol. % MgO, 1-8 mol. % CaO, 12-16 mol. % $Na_2O$. Preferably MgO+CaO is between 12 and 17 mol. % and CaO/(MgO+CaO) is in the range 0.1 and 0.4. Preferably the first and/or second ply of glazing material comprises a sheet of glass having a composition comprising 0-1 mol. % $K_2O$ Preferably the first and/or second ply of glazing material comprises a sheet of glass having a composition comprising 66-72 mol. % $SiO_2$, 2-3 mol. % $Al_2O_3$, 8-15 mol. % MgO, 3-7 mol. % CaO, 12-16 mol. % $Na_2O$. Preferably MgO+CaO is between 12 and 17 mol. % and CaO/(MgO+CaO) is in the range 0.1 and 0.4. Preferably the first and/or second ply of glazing material comprises a sheet of glass having a composition comprising 0-1 mol. % $K_2O$.

Preferably the first and/or second ply of glazing material comprises a sheet of glass having a composition comprising 67-70 mol. % $SiO_2$, 0-0.5 mol. % $B_2O_3$, 2-3 mol. % $Al_2O_3$, 8-12 mol. % MgO, 3-7 mol. % CaO, 0-1 mol. % $Li_2O$, 12-16 mol. % $Na_2O$. Preferably MgO+CaO is between 12 and 17 mol. % and CaO/(MgO+CaO) is in the range 0.2 and 0.4 Preferably the first and/or second ply of glazing material comprises a sheet of glass having a composition comprising 0-1 mol. % $K_2O$.

Preferably the first and/or second composition is substantially free of $B_2O_3$ and/or $Li_2O$.

When the second composition is a composition as described in WO2014/148020A1, preferably the second composition has a level of impurities as described in claim 6 of WO2014/148020A1 as published.

In some embodiments the first and/or second composition is a composition as described in WO99/48824A1. The composition as described in WO99/48824A1 is incorporated by reference herein and is a boron-free float glass composition capable of being chemically strengthened over a period of less than 100 hours to exhibit a surface stress of at least 400 MPa with a depth of ion penetration greater than 200 microns.

Preferably the first and/or second ply of glazing material comprises a glass sheet having a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

The present invention also provides a method for making a laminated glazing, the method comprising the steps
(i) providing a first ply of glazing material having a first composition;
(ii) bending the first ply of glazing material with a first bending process such that the bent ply of glazing material has a peripheral region having a residual surface compression stress;
(iii) providing a second ply of glazing material having a second composition;
(iv) bending the second ply of glazing material with a second bending process;
(v) joining the first ply of glazing material to the second ply of glazing material with at least one ply of adhesive interlayer material.

Preferably before the first and second plies of glazing material are joined with a ply of adhesive interlayer, the bent second ply of glazing material is chemically toughened.

It will be readily apparent that steps (iii) and (iv) may occur before steps (i) and (ii).

Preferably the first ply of glazing material comprises soda-lime-silicate glass.

Preferably the first ply of glazing material is a sheet of soda-lime-silicate glass.

Preferably the second ply of glazing material comprises an alkali aluminosilicate glass.

Preferably the second ply of glazing material is a sheet of an alkali aluminosilicate glass.

Preferably the second ply of glazing material includes at least about 6 wt % aluminium oxide.

In some embodiments the second composition is a composition as described in WO2014/148020A1.

Preferably the first and/or second ply of glazing material comprises a sheet of glass having a composition comprising 66-72 mol. % SiO2, 1-4 mol. % $Al_2O_3$, 8-15 mol. % MgO, 1-8 mol. % CaO, 12-16 mol. % $Na_2O$. Preferably MgO+CaO is between 12 and 17 mol. % and CaO/(MgO+CaO) is in the range 0.1 and 0.4. Preferably the first and/or second ply of glazing material comprises a sheet of glass having a composition comprising 0-1 mol. % $K_2O$.

Preferably the first and/or second ply of glazing material comprises a sheet of glass having a composition comprising 66-72 mol. % $SiO_2$, 2-3 mol. % $Al_2O_3$, 8-15 mol. % MgO, 3-7 mol. % CaO, 12-16 mol. % $Na_2O$. Preferably MgO+CaO is between 12 and 17 mol. % and CaO/(MgO+CaO) is in the range 0.1 and 0.4. Preferably the first and/or second ply of glazing material comprises a sheet of glass having a composition comprising 0-1 mol. % $K_2O$.

Preferably the first and/or second ply of glazing material comprises a sheet of glass having a composition comprising 67-70 mol. % $SiO_2$, 0-0.5 mol. % $B_2O_3$, 2-3 mol. % $Al_2O_3$, 8-12 mol. % MgO, 3-7 mol. % CaO, 0-1 mol. % $Li_2O$, 12-16 mol. % $Na_2O$. Preferably MgO+CaO is between 12 and 17 mol. % and CaO/(MgO+CaO) is in the range 0.2 and 0.4 Preferably the first and/or second ply of glazing material comprises a sheet of glass having a composition comprising 0-1 mol. % $K_2O$.

Preferably the first and/or second composition is substantially free of $B_2O_3$ and/or $Li_2O$.

When the second composition is a composition as described in WO2014/148020A1, preferably the second composition has a level of impurities as described in claim 6 of WO2014/148020A1 as published.

In some embodiments the first and/or second composition is a composition as described in WO99/48824A1.

Preferably the first and/or second ply of glazing material comprises a glass sheet having a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceed 3 and that the sum of the $Na_2O$ plus $K_2O$ plus MgO exceeds 22%.

The method has other preferable features.

Preferably the first bending process is a press bending process. Preferably the press bending process uses a pair of complimentary shaping moulds, there being an upper shaping mould and a lower complimentary shaping mould. Preferably the press bending process uses at least one heated shaping mould.

Preferably the second bending process is a gravity sag bending process.

Preferably the adhesive interlayer material comprises polyvinyl butyral (PVB), EVA, PVC, EMA, Polyurethane, acoustic modified PVB or Uvekol (a liquid curable resin).

Preferably the first ply of glazing material is bent such that the first ply of glazing material is curved in at least one direction. Preferably the radius of curvature in the at least one direction is between 500 mm and 20000 mm, more preferably between 1000 mm and 8000 mm.

Preferably the second ply of glazing material is bent such that the second ply of glazing material has the same curvature as the first ply of glazing material.

Preferably the peripheral region extends in a band around the entire periphery of the laminated glazing.

Preferably the band extends a distance from the periphery of the laminated glazing wherein the distance is between 200 mm and 400 mm, more preferably between 280 mm and 320 mm, even more preferably about 300 mm. Preferably the distance is between 100 mm and 200 mm.

Preferably the peripheral region or the band of the bent first ply of glazing material extends a uniform spacing from the periphery of the glazing. Preferably the spacing is between 200 mm and 400 mm, more preferably between 280 mm and 320 mm, even more preferably about 300 mm. Preferably the spacing is between 100 mm and 200 mm Preferably the residual surface compression stress in the peripheral region of the first ply of glazing material is between 5 MPa and 25 MPa, more preferably between 15 MPa and 20 MPa.

Preferably the surface compression stress in the peripheral region in the laminated glazing is between 5 MPa and 25 MPa, more preferably between 7 MPa and 25 MPa, even more preferably between 10 MPa and 20 MPa.

Preferably the residual surface compression stress is controlled by directing cooling air around the periphery of the bent outer ply after the completion of the press bending operation and before the bent outer ply is cooled to ambient conditions, i.e. a temperature less than 50° C., or less than 40° C., or less than 30° C. i.e. room temperature, for example a temperature between 10° C. and 30° C.

By blowing cooling air around the glass edges the residual surface compression stress may be controlled to be 15-20 MPa in a band extending around the periphery of the bent outer ply. Preferably the band extends 300 mm from peripheral edge of the bent outer ply.

Preferably after the cooling air is directed onto the edges for the suitable length of time to produce the required surface compression stress in the cooled bent outer ply, the bent outer ply is controllably cooled to room temperature in a suitable annealing furnace such that the surface compression stress is maintained once cooled to room temperature.

Preferably after step (ii) the first ply of glazing material has an edge region having a residual edge stress with a net tension and an edge compression, wherein the residual edge stress of the first ply in the edge region has a net tension less than 15 MPa, preferably less than 14 MPa, more preferably less than 13 MPa, even more preferably less than 12 MPa, most preferably less than 11 MPa.

Preferably after step (ii) the first ply of glazing material has an edge region having a residual edge stress with a net tension and an edge compression, wherein the edge compression of the first ply is greater than 24 MPa, preferably greater than 25 MPa, more preferably greater than 26 MPa, even more preferably greater than 27 MPa, even more preferably greater than 28 MPa, even more preferably greater than 29 MPa, even more preferably greater than 30 MPa.

The present invention also provides a laminated glazing comprising a first ply of glazing material and a second ply of glazing material, the first ply of glazing material having a thickness between 1.5 mm and 2.5 mm and being annealed soda-lime-silica glass, the second ply having a thickness between 0.4 mm and 1.2 mm and being chemically toughened glass, the first ply of glazing material being joined to the second ply of glazing material by at least one ply of adhesive interlayer material, the first ply of glazing material prior to being incorporated in the laminated glazing having a peripheral region having a first residual surface compression stress, and wherein when incorporated in the laminated glazing the first ply of glazing material has a second residual surface compression stress in the peripheral region.

Preferably the first ply of glazing material prior to being incorporated in the laminated glazing has an edge region having a residual edge stress with a net tension below 11 MPa.

Preferably the first ply of glazing material prior to being incorporated in the laminated glazing has an edge compression above 25 MPa.

Preferably the first ply of glazing material prior to being incorporated in the laminated glazing has a residual surface compression stress in the peripheral region between 15 MPa and 20 MPa.

Preferably the first ply of glazing material after being incorporated in the laminated glazing has a residual surface compression stress in the peripheral region between 10 MPa and 20 MPa.

Preferably the first residual surface compression stress is greater than the second residual surface compression stress.

When configured as a vehicle windscreen, the first ply is configured as the outer ply and the second ply is configured to face the interior of the vehicle. Such a laminated glazing according to the present is lightweight and has improved stone impact performance compared to conventional laminated windscreens.

Preferably the second ply of glazing material is an alkali aluminosilicate glass composition.

Preferably the ply of glazing material includes at least about 6 wt % aluminium oxide ($Al_2O_3$).

In some embodiments the second ply has a composition as described in WO2014/148020A1.

Preferably the second ply has a composition comprising 66-72 mol. % $SiO_2$, 1-4 mol. % $Al_2O_3$, 8-15 mol. % MgO, 1-8 mol. % CaO, 12-16 mol. % $Na_2O$. Preferably MgO+CaO is between 12 and 17 mol. % and CaO/(MgO+CaO) is in the range 0.1 and 0.4. Preferably the second ply has a composition comprising 0-1 mol. % $K_2O$.

Preferably the second ply has a composition comprising 66-72 mol. % $SiO_2$, 2-3 mol. % $Al_2O_3$, 8-15 mol. % MgO, 3-7 mol. % CaO, 12-16 mol. % $Na_2O$. Preferably MgO+CaO is between 12 and 17 mol. % and CaO/(MgO+CaO) is in the range 0.1 and 0.4. Preferably the second ply has a composition comprising 0-1 mol. % $K_2O$.

Preferably the second ply has a composition comprising 67-70 mol. % $SiO_2$, 0-0.5 mol. % $B_2O_3$, 2-3 mol. % $Al_2O_3$, 8-12 mol. % MgO, 3-7 mol. % CaO, 0-1 mol. % $Li_2O$, 12-16 mol. % $Na_2O$. Preferably MgO+CaO is between 12 and 17 mol. % and CaO/(MgO+CaO) is in the range 0.2 and 0.4. Preferably the second ply has a composition comprising 0-1 mol. % $K_2O$.

Preferably the second ply has a composition that is substantially free of $B_2O_3$ and/or $Li_2O$.

When the second ply has a composition as described in WO2014/148020A1, preferably the second ply has a composition having a level of impurities as described in claim 6 of WO2014/148020A1 as published.

In some embodiments the second ply has a composition as described in WO99/48824A1.

Preferably the second ply has a composition comprising (by weight) 58% to 70% $SiO_2$, 5% to 15% $Al_2O_3$, 12% to 18% $Na_2O$, 0.1% to 5% $K_2O$, 4% to 10% MgO and 0% to 1% CaO with the provisos that the sum of the $Al_2O_3$ and MgO exceeds 13%, that the sum of the amounts of $Al_2O_3$ plus MgO divided by the amount of $K_2O$ exceeds 3 and that the sum of the $Na_2O$ plus $K_2O$ plus MgO exceeds 22%.

The present invention also provides a glass sheet for a laminated glazing, the glass sheet having a periphery and a residual surface compression stress in a peripheral region extending around the periphery of the glass sheet, the peripheral region extending a distance from the periphery, wherein the residual surface compression stress in the peripheral region is between 15 MPa and 20 MPa, the glass sheet having an edge region having a residual edge stress with a net tension below 11 MPa and an edge compression of at least 25 MPa.

The glass sheet may be used as a ply in a vehicle glazing, in particular a windscreen, backlight, side window or sunroof, or as part of a glazing for a building.

Preferably the distance the peripheral region extends from the periphery of the glass sheet is between 200 mm and 400 mm, more preferably between 280 mm and 320 mm, even more preferably about 300 mm. Preferably the distance is between 100 mm and 200 mm.

Preferably the glass sheet is a soda-lime-silicate composition such as clear float glass. By clear float glass, it is meant a glass having a composition as defined in BS EN 572-1 and BS EN 572-2 (2004).

Suitably the glass sheet is tinted with additives such as iron oxide, selenium, nickel oxide and cobalt oxide.

A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; SO3 0-2% and $Fe_2O_3$ 0.005-2%. The glass composition may also contain other additives, for example, refining aids, which would normally be present in an amount of up to 2%. The transmitted glass colour may be measured in terms of a recognised standard such as BS EN410.

Preferably the glass sheet has a thickness between 1.5 mm and 2.5 mm, more preferably between 1.6 mm and 2.3 mm.

Preferably the glass sheet is produced by press bending a glass sheet between a pair of press bending members.

Suitably the glass sheet has a central region inboard of the peripheral region wherein the surface of the glass sheet in the central region is in compression.

Suitably the glass sheet has a central region inboard of the peripheral region wherein the target is to have the surface of the glass sheet in the central region in compression.

The present invention will now be described with reference to the following figures in which.

In the following description of the present invention, the surface compression stress measurements are made using a Strainoptics Laser GASP-CS (http://www.strainoptics.com/files/Laser%20GASP-CS%20Quick-Start%20(English).pdf). Such equipment is available from Strainoptics, Inc., 108 W. Montgomery Avenue, North Wales, Pa. 19454 USA.

The edge stress measurements are made using a Sharples S-69 Stress Meter in reflection, such equipment being available from Sharples Stress Engineers Ltd, Unit 29 Old Mill Industrial Estate, School Lane, Bamber Bridge, Preston, Lancashire, PR5 6SY UK (http://www.sharplesstress.com/edgestress.htm). Edge stress measurements may also be made in transmission if no obscuration band (or the like) is on one or more of the glass surfaces being measured.

Figure 1:
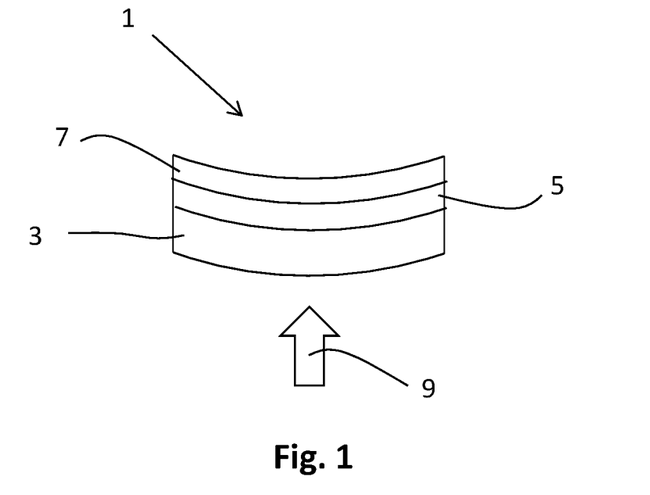
FIG. 1 is a cross section view of a laminated glazing according to the present invention.

FIG. 1 shows a cross section of a curved laminated glazing in accordance with the present invention.

The laminated glazing 1 has a first ply 3 of soda-lime-silicate glass having a composition such as clear float glass, typically with the addition of iron oxide as a tinting agent to provide the laminated glazing with some form of solar control. The first ply 3 has a thickness of 2.3 mm although the thickness may be in the range 1.4 mm to 2.5 mm or in the range 1.6 mm to 2.3 mm.

A typical soda-lime-silicate glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO3$ 0-2%; $Fe_2O_3$ 0.005-2%. The glass composition may also contain other additives, for example, refining aids, which would normally be present in an amount of up to 2%. The soda-lime-silica glass composition may contain other colouring agents such as $Co_3O_4$, $NiO$ and $Se$ to impart to the glass a desired colour when viewed in transmitted light. The transmitted glass colour may be measured in terms of a recognised standard such as BS EN410.

The laminated glazing 1 also has a second ply 7 of chemically strengthened alkali aluminosilicate glass such as Gorilla™ glass available from Corning Incorporated. The second ply 7 has a thickness of 1 mm although the thickness of the second ply may be in the range 0.4 mm to 1.2 mm or in the range 0.5 mm to 1 mm.

A specific composition for the second ply 7 is 68 mol % $SiO_2$, 2.5 mol % $Al_2O_3$, 11 mol % $MgO$, 3.7 mol % $CaO$, 14.2 mol % $Na_2O$, 0.6 mol % $K_2O$. For this composition $MgO+CaO$ is 14.7 mol % and $Na_2O+K_2O$ is 14.8 mol %. This is composition number 13 in table 2 on page 20 of WO2014/148020A1 as published. The iron oxide ($Fe_2O_3$) content of the second ply may be low, being less than 0.1 percent by weight i.e. about 0.012 percent by weight.

The first ply 3 is joined to the second ply 7 by an adhesive interlayer 5. The adhesive interlayer 5 is a 0.76 mm thick ply of PVB. The adhesive interlayer 5 may have a thickness between 0.3 mm and 1.8 mm.

Other suitable adhesive interlayers include PVC, EVA, EMA and polyurethane.

The laminated glazing 1 is curved in one or more directions. The radius of curvature in one of the one or more directions is between 1000 mm and 8000 mm.

When the laminated glazing is curved in two directions, suitably each direction of curvature is orthogonal to the other. Suitably the radius of curvature in one or both directions of curvature is between 1000 mm and 8000 mm.

The first ply 3 has a concave surface and an opposing convex surface. The second ply 7 has a convex surface and an opposing concave surface. The concave surface of the first ply 3 is in contact with the adhesive interlayer 5 and the convex surface of the second ply 7 is in contact with the adhesive interlayer 5. Using conventional nomenclature, the convex surface of the first ply 3 is "surface one" (or S1) of the laminated glazing 1, the concave surface of first ply 3 is "surface two" (or S2) of the laminated glazing 1, the convex surface of second ply 7 is "surface three" (or S3) of the laminated glazing 1 and the concave surface of second ply 7 is "surface four" (or S4) of the laminated glazing 1. As can be seen from FIG. 1, the edge of the laminated glazing comprises the edge of the first ply of glazing material 3, the edge of the second ply of glazing material 7 and the edge of the adhesive interlayer 5.

The laminated glazing 1 may be a vehicle glazing such as a vehicle windscreen, a vehicle sunroof, a vehicle sidelight or a vehicle backlight. The laminated glazing 1 may be a glazing for a building, in which case the laminated glazing would typically be flat.

In use, surface one faces the exterior of the vehicle or building in which the laminated glazing 1 is installed, and surface four faces the interior of the vehicle of building in which the laminated glazing 1 is installed. In accordance with the present invention the laminated glazing has a surface residual compression stress in a 300 mm band extending around the periphery of the windscreen ranging from 10 MPa to 20 MPa. This is the surface compression stress for the convex surface of the first ply 3. The first ply 3 of the laminated glazing has an edge region having a residual edge stress with a net tension below 11 MPa and an edge compression above 25 MPa.

Figure 2:
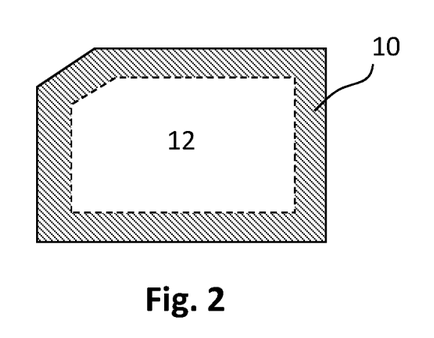
FIGS. 2-4 are plan views of laminated glazings in accordance with the present invention.
Figure 3:
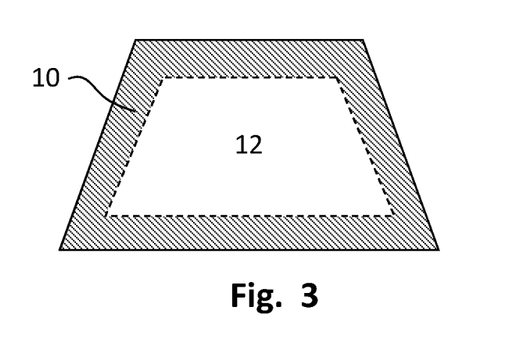
Figure 4:
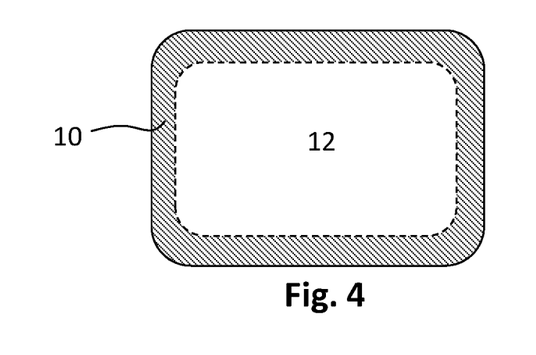

When viewed in the direction of arrow 9, the plan view of the laminated glazing may have a major surface having a periphery as shown in FIGS. 2, 3 and 4.

In FIG. 2, the periphery is typical of a vehicle sidelight. In FIG. 3 the periphery is typical of a vehicle windscreen. In FIG. 4 the periphery is typical of a vehicle sunroof. In all the FIGS. 2, 3 and 4 there is shown peripheral region in the form of a band 10 extending around the periphery of the respective laminated glazing. In these examples the band extends 300 mm from the edge of the glazing towards the centre of the major surface of the glazing, all the way around the periphery as shown.

Each FIGS. 2, 3 and 4 shows the respective laminated glazing has a central region 12 inboard of the peripheral region 10, the surface being in compression in region 12.

Figure 5:
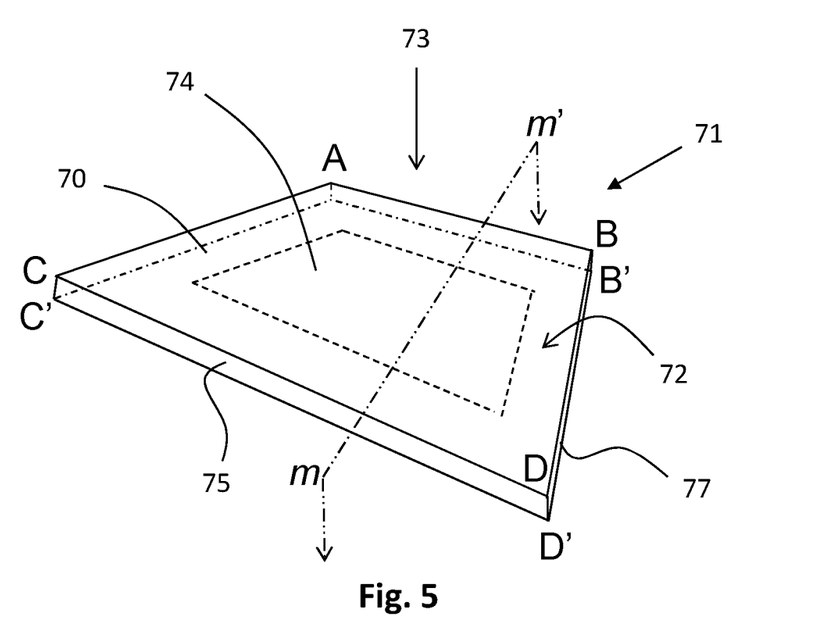
FIG. 5 shows a schematic perspective representation of a glass ply useful for making a vehicle windscreen.

FIG. 5 shows a schematic perspective view of a glass ply 71 used to make a laminated glazing having a periphery as shown in FIG. 3 i.e. a glass ply for a vehicle windscreen.

The glass ply 71 is a sheet of soda-lime silicate glass i.e. float glass and has a thickness of 2.1 mm. The glass sheet has an iron oxide content expressed as $Fe_2O_3$ in the range 0.1-2% by weight, in particular 0.6-1.2% by weight.

When viewed in the direction of arrow 73 the glass ply 71 has a first major surface 72 and an opposing major surface 72' (not labelled in the figure). The direction specified by arrow 73 is in a direction normal to the first major surface 72. The edge of the glass ply 71 is the minor surface extending around and between the first and second major surfaces. In FIG. 5 the edge is made up of edge portions including edge portion 75 and edge portion 77. When viewed in the direction of the arrow 73 the glass ply has a periphery defined by the lines joining points ABCD. The other opposing major surface has corresponding point A'B'C'D' (only B', C' and D' are shown in the figure).

The edge portion 75 is the minor surface bounded by lines CD, DD', C'D' and CC'.

In FIG. 5, edge portions 75, 77 are shown as flat but may be curved, for example because the initially cut edge has been edge worked.

When viewed in the direction of arrow 73, the band 70 corresponds to the band 10 shown in FIG. 3. Inboard of the band 70 is a central region 74.

Although in FIG. 5 the glass ply 71 is shown as being flat, the glass ply 71 may be curved such that the major surface 72 is a convex surface and the opposing major surface 72' is a concave surface.

Figure 6:
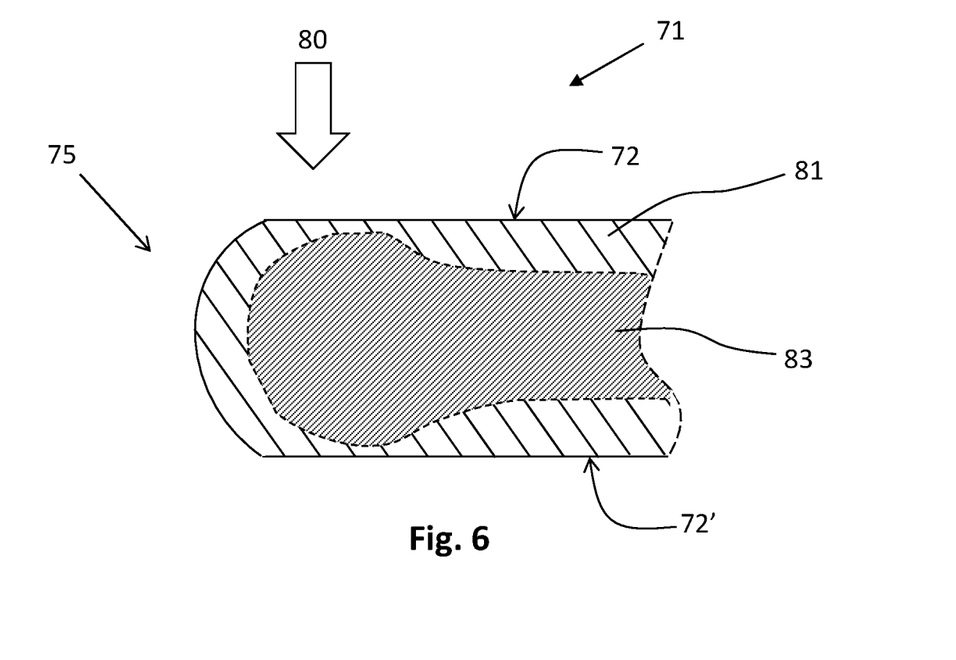
FIG. 6 shows a cross-sectional view of a glass ply to show the stresses therein.

FIG. 6 is a cross section of the glass ply 71 in the plane m-m'. In FIG. 6 the edge portion 75 is shown as being rounded, but may be flat. The glass ply 71 can be seen to have a compression layer 81 and a tension layer 83. The surface compression stress is the compressive stress in surface 72 and is measured using a Strainoptics Laser GASP-CS. The edge compression is the compressive stress at the edge portion 75 and is measured using a Sharples S-69 Stress Meter in reflection or transmission.

Figure 7:
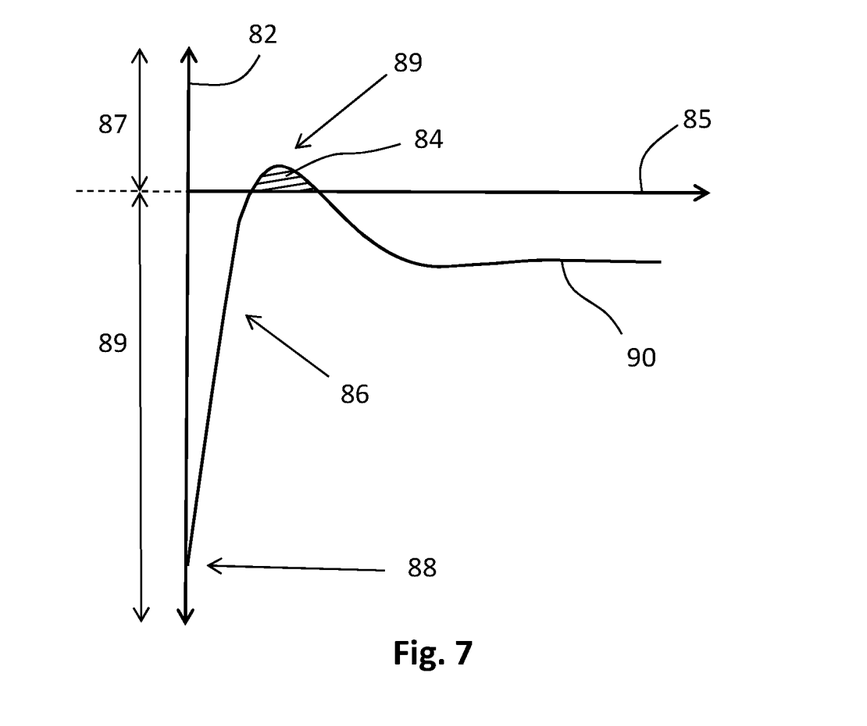
FIG. 7 shows a graphical representation of the average stresses through the thickness of a glass ply as a function of distance from the edge of the glass ply.

FIG. 7 shows how the average stresses vary with distance from the edge of the glass ply when measured through the glass thickness i.e. in the direction of arrow 80 in FIG. 6 (which is normal to the surface 72). The vertical axis 82 is used to represent the physical edge of the glass and the axis 85 denotes the distance therefrom. Axis portion 87 denotes average tension and axis portion 89 denotes average compression (both when measured through the glass thickness). The net stress when measured through the glass thickness i.e. in the direction of arrow 80, is given by line 90.

At the edge region the glass has a compression region 86 with a maximum edge compression 88 at the physical edge of the glass. Moving inboard the edge there is a region of net tension 84 with a maximum net tension 89.

Absent any other external stresses, for example when the glass ply is incorporated in a frame or vehicle body, the stresses in the glass ply are known as residual stresses.

Figure 8:
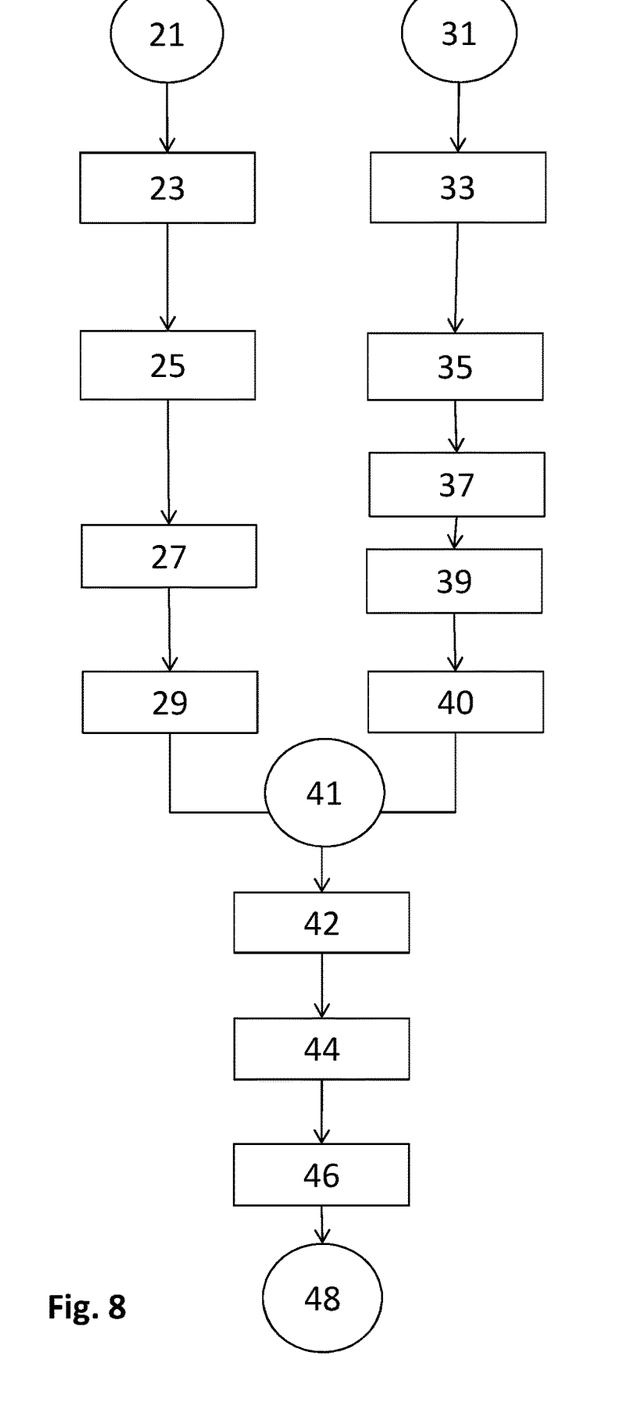
FIG. 8 is a schematic flowchart of the lamination process used to produce a laminated glazing in accordance with the present invention.

With reference to FIG. 8, a laminated vehicle windscreen according to the present invention is manufactured as follows.

Initially a sheet of soda-lime silicate glass is provided at step 21. The soda-lime-silicate glass may be clear or tinted. In this example a sheet of clear float glass is provided at step 21. By clear float glass, it is meant a glass having a composition as defined in BS EN 572-1 and BS EN 572-2 (2004).

The sheet of clear float glass is 2.3 mm thick and at step 23 is cut to the desired shape using conventional techniques. Once bent, the cut sheet of clear float glass will be the outer ply of the windscreen. The cut sheet of clear float glass before being bent is known as the outer blank.

The sheet of clear float glass may have a thickness between 1.6 mm and 2.3 mm.

At step 25 the edges of the outer blank are edge worked following which the outer blank is washed.

After washing, one or both major surfaces of the outer blank may be printed with a layer of ink, which may be optically opaque and/or electrically conductive. Such printed inks may be used to form an obscuration band around the periphery of the outer ply, as is conventional in the art.

At step 27 the outer blank is heated to glass softening temperature in a suitable furnace. The heat softened glass is press bent between a pair of complimentary shaping members to impart a desired curvature to the outer ply. Press bending allows a precise control of the shape of the outer ply.

Example press bending stations are described in WO2005/033026A1 and EP0677486A2.

To control the stresses in the outer ply, the upper and/or lower press bending member is heated to control the residual edge stress and/or the edge compression of the outer ply.

By selection of the temperature of the upper and/or lower press bending members it is possible to produce an outer ply having an edge region having a residual edge stress with a net tension below 11 MPa and an edge compression above 25 MPa.

The residual surface stress can be controlled by directing cooling air around the periphery of the bent outer ply shortly after the completion of the press bending operation and before the bent outer ply is cooled to room temperature.

Figure 9:
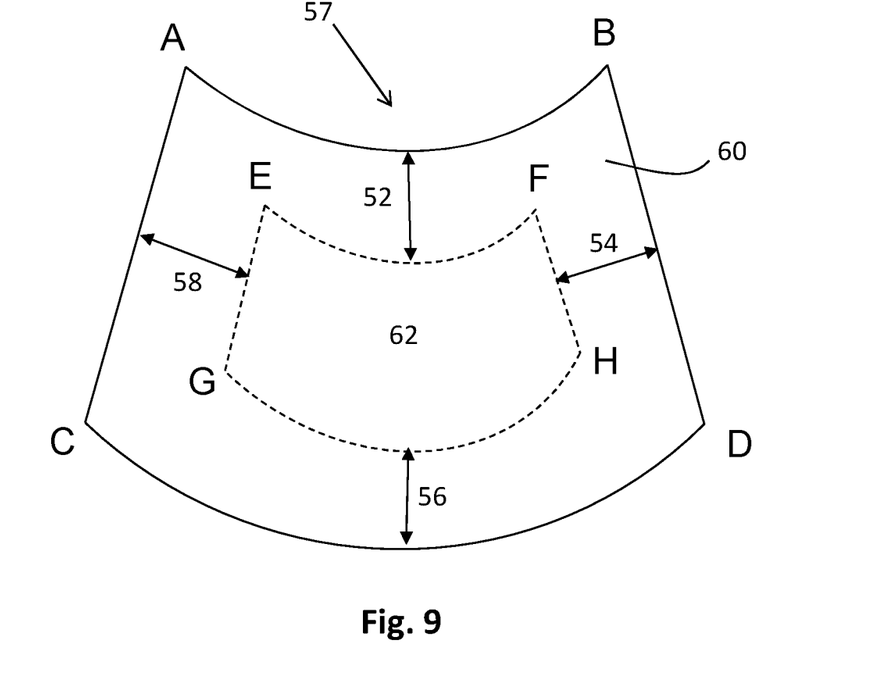
FIG. 9 is a plan view of an outer ply of glass prior to being incorporated into a laminated glazing.

By blowing cooling air around the glass edges the residual surface stress is controlled to 15-20 MPa in a band extending around the periphery of the bent outer ply, the band extending 300 mm from peripheral edge of the bent outer ply. This is shown in FIG. 9.

After the cooling air is directed onto the edges for the suitable length of time to produce the required residual stress in the cooled bent outer ply, the bent outer ply is controllably cooled at step 29 to room temperature in a suitable annealing furnace.

Bending the outer plies may be part of a batch process, with a number of outer plies being bent one after another.

The outer ply may be bent in one or more directions. The curvature in the one or more directions may have a radius of curvature between 1000 mm and 8000 mm.

The inner ply of the laminated glazing is produced as follows.

At step 31 a sheet of alkali aluminosilicate glass such as Gorilla™ glass available from Corning Incorporated is provided and will be used for the inner ply of the windscreen. Suitable alkali aluminosilicates compositions are described in U.S. Pat. No. 7,666,511 B2, WO2014/148020A1 and WO99/48824A1.

A specific composition for the inner ply is 68 mol % $SiO_2$, 2.5 mol % $Al_2O_3$, 11 mol % MgO, 3.7 mol % CaO, 14.2 mol % $Na_2O$, 0.6 mol % $K_2O$. For this composition MgO+CaO is 14.7 mol % and $Na_2O+K_2O$ is 14.8 mol %. This is composition number 13 in table 2 on page 20 of WO2014/148020A1 as published.

The sheet of alkali aluminosilicate glass is 1 mm thick and is cut at step 33 to have the same periphery as the unbent outer blank. Before being bent, the cut sheet of alkali aluminosilicate glass is known as the inner blank. The sheet of alkali aluminosilicate glass may have a thickness between 0.4 mm and 1.2 mm, or a thickness between 0.5 mm and 1 mm.

At step 35, the inner blank is suitably edge worked and washed prior to being bent.

At step 37 the inner blank is placed on a suitable ring mould to support the inner blank close to the periphery thereof. The inner blank is heated to sufficient temperature to cause the alkali aluminosilicates glass to soften and sag under the influence of gravity, conventionally referred to as sag bending. The glass sag bends to a shape close to that of the bent outer ply. However the curvature of the inner ply may not be the same as the outer ply.

At step 39 the bent inner ply is then annealed using controlled cooling to reduce the temperature to room temperature.

At step 40 the bent inner ply of alkali aluminosilicate glass is chemically strengthened using an ion exchange process. Typically sodium ions are chemically exchanged for potassium ions.

For the specific composition mentioned above, it is possible to chemically strengthen the inner ply to have surface compressive stress greater than 400 MPa, typically between 450 MPa and 675 MPa. The depth of layer (DOL) of the chemically strengthened glass ply was between 10 µm and 60 µm.

It is also envisaged that the bent inner ply of alkali aluminosilicate glass may be thermally toughened although it is difficult to thermally toughen plies of glass that have a thickness of 1 mm or less.

At step 41 a bent outer ply (following steps 21-29) and a bent inner ply (following steps 31-40) are provided.

The pair of bent inner and outer plies are washed at step 42 and at step 44 a ply of interlayer material having a thickness between 0.3 mm and 1.5 mm is positioned between the inner ply and the outer ply. In this particular example the interlayer material was a 0.76 mm thick ply of PVB, although other suitable adhesive interlayer material may be used, for example acoustic modified PVB.

At step 46 the assembly of inner ply and outer ply with PVB ply therebetween are laminated using suitable lamination conditions to join the inner ply to the outer ply via the PVB ply.

The laminated glazing so produced at step 48 is washed and inspected prior to being delivered to a customer.

The resulting laminated windscreen has a surface residual stress where there is a surface compression band ranging from 10 MPa to 20 MPa extending around the periphery of the bent outer ply, the band extending 300 mm from peripheral edge of windscreen. The windscreen has an edge region having a residual edge stress with a net tension less than 11 MPa and an edge compression greater than 25 MPa. The outer ply in the laminated glazing may have a different surface compression stress in the peripheral region when compared to the bent outer ply prior to being incorporated in the laminated glazing because of the stress imparted to the outer ply from the lamination process.

Figure 10:
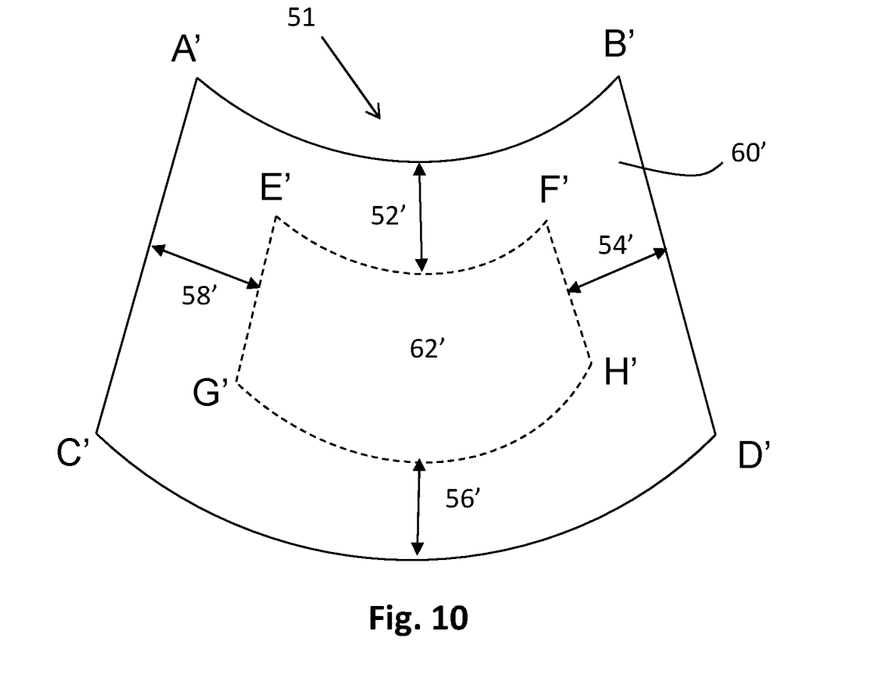
FIG. 10 is a plan view of the outer ply of FIG. 9 when incorporated in a laminated glazing of the type shown in FIG. 1.

With reference to FIGS. 9 and 10, there is shown in FIG. 9 a plan view of a bent outer ply 57 produced at step 29 i.e. a bent ply of soda-lime-silicate glass. The outer ply 57 has four corners A, B, C and D. The line connecting corner A to corner C is substantially straight. The line connecting corner B to corner D is substantially straight. The line connecting corner A to corner B is curved and the line connecting corner C to corner D is curved. The periphery of the outer ply 57 is defined by the lines AB+BD+DC+CA.

FIG. 9 illustrates the band that extends around the periphery. Within the periphery of the outer ply 57 is a band i.e. band is inboard of the periphery. The band has a width 52, 54, 56 and 58. Typically the distances 52, 54, 56 and 58 are the same. In this example the distances 52, 54, 56 and 58 are 300 mm. The band can be thought as defining a surface compression stress region 60, beyond which (i.e. inboard of) is a central region 62 where the surface in the central region 62 is in compression. The central region is defined by the points E, F, G and H. The line connecting points E and G is substantially straight and parallel to line AC. The line connecting points F and H is substantially straight and parallel to line BD. The line connecting points E and F is curved and parallel to line AB. The line connecting points G and H is curved and parallel to line CD.

The surface compression stress region 60 is equivalent to the region 10 shown in FIG. 3 i.e. the surface compression stress region 60 is a peripheral region. In this example the surface compression stress in the surface compression stress region 60 is between 15 MPa and 20 MPa.

With reference to FIG. 8 and FIG. 10, FIG. 10 shows a plan view of laminated glazing produced at step 48 (as viewed in the direction of arrow 9 of FIG. 1).

The periphery of the laminated glazing 51 is defined in terms of the points A', B', C' and D'. These points correspond to the points A, B, C and D of FIG. 9.

The surface compression stress region 60' of the laminated glazing 51 is defined in the same way as the surface compression stress region 60 i.e. the surface compression stress region 60' is a peripheral region. The surface compression stress in the surface compression region 60' is between 10 MPa and 20 MPa.

Bounded by the peripheral stress region 60' is a central region 62' where the surface in central region 62' is in compression. As for the outer ply shown in FIG. 9, the distances 52', 54', 56' and 58' are 300 mm.

The present invention provides a laminated glazing, in particular a vehicle windscreen, sunroof, backlight or sidelight, comprising an annealed outer glass with a thickness ranging from 1.6 mm to 2.3 mm laminated with an adhesive interlayer to a chemically toughened inner ply with a thickness ranging from 0.5 to 1 mm. The outer ply is produced by press bending to fully meet customer surface design with a residual surface compression stress on a 300 mm band around the windscreen contour ranging from 15 MPa to 20 MPa and a residual edge stress with a net tension below 11 MPa and an edge compression above 25 MPa. The inner ply is bent using a gravity bending process to an intermediate shape able to give a surface residual stress after lamination on the 300 mm band around the windscreen ranging from 10 MPa to 20 MPa, and with a residual edge stress of the outer ply with a net tension below 11 MPa and an edge compression above 25 MPa.

In accordance with the present invention it has been found that due to the strength of the chemically strengthened inner ply it is not necessary to bend the inner ply to the same degree of precision as the outer ply. The shape of the windscreen is essentially fixed by the outer ply and the inner ply is able to flex slightly to be able to conform to the shape of the outer ply when joined thereto via an adhesive interlayer. The stress in the resulting laminated windscreen can be modified by the stress profile in the surface of the outer ply and the stress characteristics of the chemically strengthened inner ply. It has been found that by having a windscreen made in accordance with the present invention it is possible to have a lightweight windscreen that has superior stone impact performance compared to conventional windscreens.

The invention claimed is:

1. A method for making a laminated glazing, the method comprising the steps
   (i) providing a first ply of glazing material having a first composition;
   (ii) bending the first ply of glazing material with a first bending process such that the bent ply of glazing material has a peripheral region having a residual surface compression stress in the peripheral region between 5 MPa and 30 MPa;
   (iii) providing a second ply of glazing material having a second composition;
   (iv) bending the second ply of glazing material with a second bending process;
   (v) joining the first ply of glazing material to the second ply of glazing material with a ply of adhesive interlayer material,
   wherein following step (v) the first ply of glazing material has a residual surface compression stress in the peripheral region that is lower compared to the residual surface compression stress in the peripheral region at step (ii).

2. A method according to claim 1, wherein before the first and second plies of glazing material are joined with a ply of adhesive interlayer, the second ply of glazing material is chemically strengthened.

3. A method according to claim 2, wherein the second ply of glazing material is chemically strengthened to have a depth of layer between 10 μm and 60 μm.

4. A method according to claim 1, wherein the first bending process is a press bending process and/or wherein the second bending process is a gravity sag bending process.

5. A method according to claim 1, wherein the second ply of glazing material comprises an alkali aluminosilicate glass; or
   wherein the second composition comprises a boron-free float glass composition capable of being chemically strengthened over a period of less than 100 hours to exhibit a surface stress of at least 400 MPa with a depth of ion penetration greater than 200 microns; or
   wherein the second composition comprises, in mol %: 66 to 72% $SiO_2$; 1 to 4% $Al_2O_3$; 8 to 15% MgO; 1 to 8% CaO; 12 to 16% $Na_2O$; and 0 to 1% $K_2O$, wherein a total content of MgO and CaO is in a range of 12 to 17%, and a molar ratio of CaO to the total content of MgO and CaO is in a range of 0.1 to 0.4;
   and/or wherein the first ply of glazing material comprises soda-lime-silicate glass.

6. A method according to claim 1, wherein following step (v) the residual surface compression stress in the peripheral region of the first ply of glazing material is between 5 MPa and 25 MPa.

7. A method according to claim 1, wherein the residual surface compression stress is controlled by directing cooling air around the periphery of the bent outer ply after the completion of the bending operation and before the bent outer ply is cooled to ambient conditions.

8. A method according to claim 1, wherein after step (ii) the first ply of glazing material has an edge region having a residual edge stress with a net tension and an edge compression, wherein the residual edge stress of the first ply in the edge region has a net tension less than 15 MPa.

9. A method according to claim 1, wherein after step (ii) the first ply of glazing material has an edge region having a residual edge stress with a net tension and an edge compression, wherein the edge compression of the first ply is greater than 24 MPa.

10. A method for making a laminated glazing, the method comprising the steps
    (i) providing a first ply of glazing material having a first composition;
    (ii) bending the first ply of glazing material with a first bending process such that the bent ply of glazing material has a peripheral region having a residual surface compression stress;
    (iii) providing a second ply of glazing material having a second composition;
    (iv) bending the second ply of glazing material with a second bending process;
    (v) joining the first ply of glazing material to the second ply of glazing material with a ply of adhesive interlayer material,
    wherein before step (v) the second ply of glazing material is chemically strengthened to have a depth of layer between 10 μm and 60 μm.

11. A method according to claim 10, wherein the first bending process is a press bending process and/or wherein the second bending process is a gravity sag bending process.

12. A method according to claim 10, wherein the first ply of glazing material comprises soda-lime-silicate glass and/or wherein the second ply of glazing material comprises an alkali aluminosilicate glass.

13. A method according to claim 10, wherein following step (v) the residual surface compression stress in the peripheral region of the first ply of glazing material is between 5 MPa and 25 MPa.

14. A method according to claim 10, wherein the residual surface compression stress is controlled by directing cooling air around the periphery of the bent outer ply after the completion of the bending operation and before the bent outer ply is cooled to ambient conditions.

15. A method according to claim 10, wherein after step (ii) the first ply of glazing material has an edge region having a residual edge stress with a net tension and an edge compression, wherein the residual edge stress of the first ply in the edge region has a net tension less than 15 MPa.

16. A method according to claim 10, wherein after step (ii) the first ply of glazing material has an edge region having a residual edge stress with a net tension and an edge compression, wherein the edge compression of the first ply is greater than 24 MPa.

17. A laminated glazing comprising a first ply of glazing material and a second ply of glazing material joined by at least one ply of adhesive interlayer material, the first ply of glazing material comprising a sheet of glass having a first composition and the second ply of glazing material comprising a sheet of glass having a second composition different to the first composition, wherein the laminated glazing has (i) a peripheral region extending around the periphery of the laminated glazing, the laminated glazing having a surface compression stress in the peripheral region and (ii) an edge compression, wherein the magnitude of the edge compression is greater than the magnitude of the surface compression stress in the peripheral region;
    wherein the first composition comprises $Fe_2O_3$ between 0.005 and 2% by weight;

wherein the first ply of glazing material has an edge compression greater than 24 MPa; and wherein the second ply of glazing material is a sheet of glass that has been chemically strengthened to have a depth of layer between 10 μm and 60 μm.

18. A laminated glazing according to claim 17, wherein the second composition is an alkali aluminosilicate glass composition and/or wherein the second composition includes at least about 6 wt % aluminium oxide.

19. A laminated glazing according to claim 17, wherein the second ply of glazing material has a concave surface and an opposing convex surface, wherein the convex surface faces the ply of adhesive interlayer material.

20. A vehicle glazing, in particular a windscreen, backlight, side window or sunroof, or a glazing for a building, comprising a laminated glazing according to claim 17.

* * * * *